United States Patent [19]

Joynt et al.

[11] 4,397,498
[45] Aug. 9, 1983

[54] COLLAPSIBLE OUTRIGGER SIDE EXTENSION FOR LOAD BED

[75] Inventors: Gerald E. Joynt; Michael L. Chan, both of Sioux City, Iowa

[73] Assignee: Wilson Trailer Company, Sioux City, Iowa

[21] Appl. No.: 285,972

[22] Filed: Jul. 22, 1981

[51] Int. Cl.³ .............................................. B62D 33/02
[52] U.S. Cl. ...................................... 296/182; 296/26; 280/656; 108/78
[58] Field of Search .................... 296/26, 174, 204, 13, 296/182; 280/656, 762, 795; 108/78, 77; 248/289 A

[56] References Cited

U.S. PATENT DOCUMENTS

| | | | |
|---|---|---|---|
| 905,026 | 11/1908 | Tritch et al. | 108/78 |
| 2,717,802 | 9/1955 | Martin | 296/182 |
| 2,743,936 | 5/1956 | Bigge | 280/656 |
| 4,015,858 | 4/1977 | Love | 296/182 |
| 4,127,300 | 11/1978 | Melley et al. | 296/182 |
| 4,311,322 | 1/1982 | Verros | 280/656 |

Primary Examiner—Robert R. Song
Attorney, Agent, or Firm—Harvey B. Jacobson

[57] ABSTRACT

A generally horizontal load bed is provided including a longitudinal marginal edge and a plurality of cantilever support arms are spaced along the marginal edge of the support bed and pivotally supported therefrom at one set of corresponding ends of the arms for angular displacement of the arms relative to said load bed about upstanding axes for swinging between extended positions with the other set of corresponding ends of the arms projecting outwardly from the load bed marginal edge and folded positions with the arms generally paralleling the load bed marginal edge. An elongated extension panel assembly is provided and parallels the load bed marginal edge and overlies and is supported from the support arms. Pivot structure pivotally supports the longitudinal marginal edge of the extension panel adjacent the load bed from the arms for swinging between an operative horizontal position overlying the arms when the latter are extended and an inoperative vertical position disposed immediately outwardly of the arms when the latter are in the folded positions, the pivot structure also serving to interconnect the support arms for simultaneous and equal swinging thereof between the extended and folded positions thereof.

8 Claims, 6 Drawing Figures

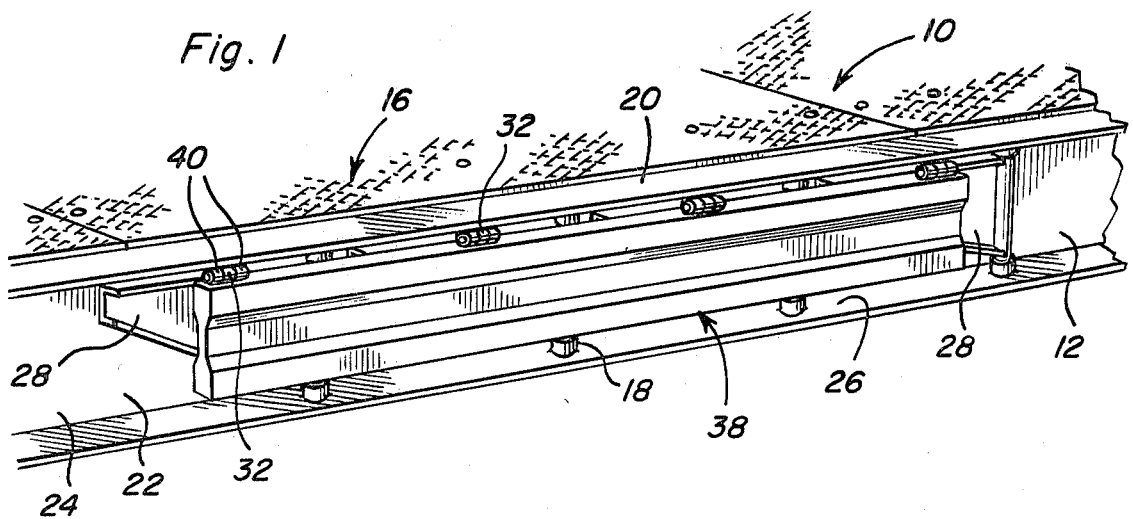
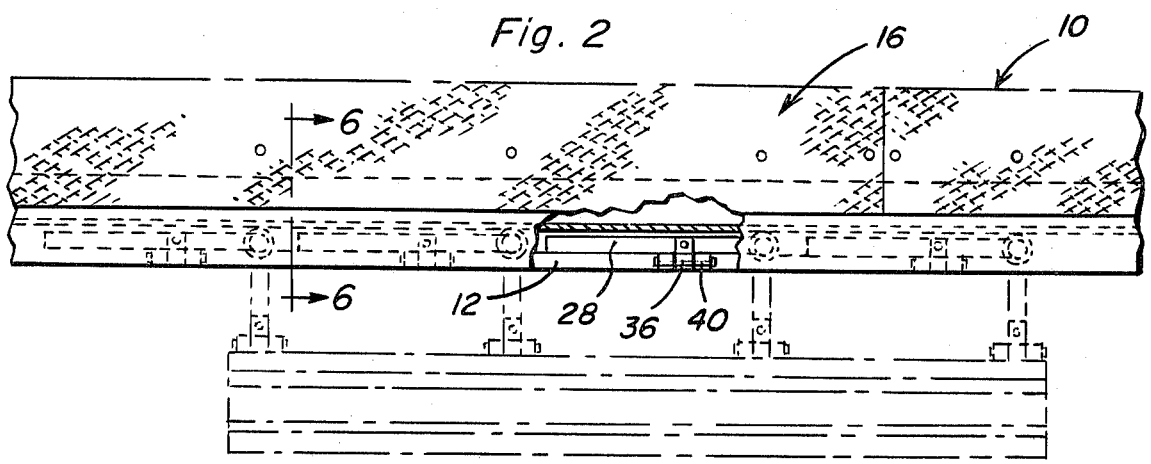
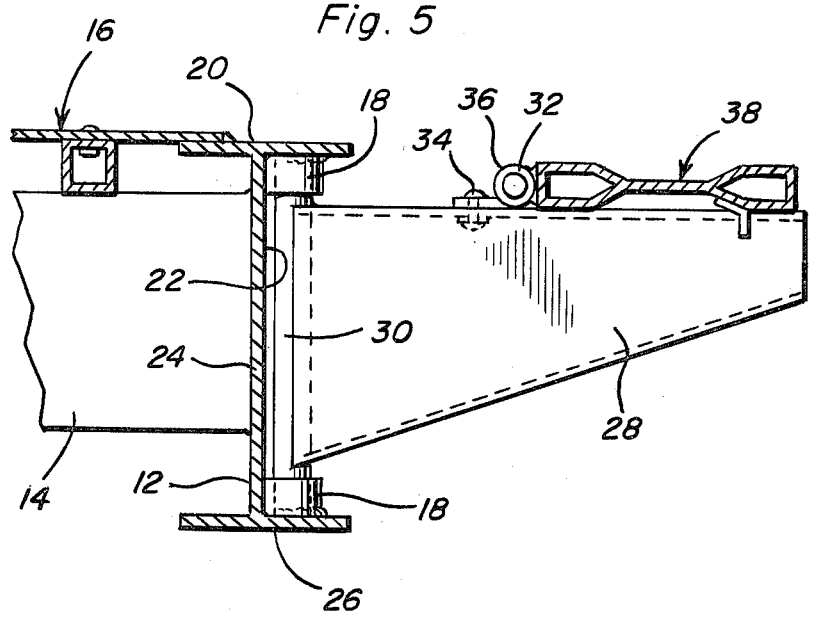
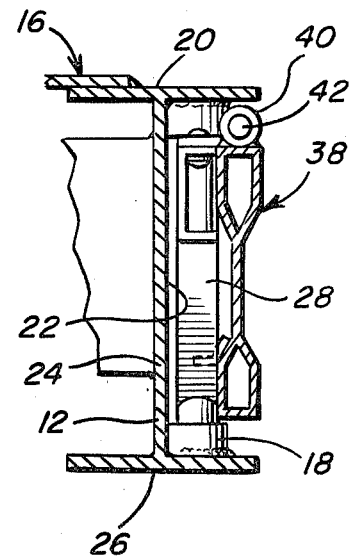

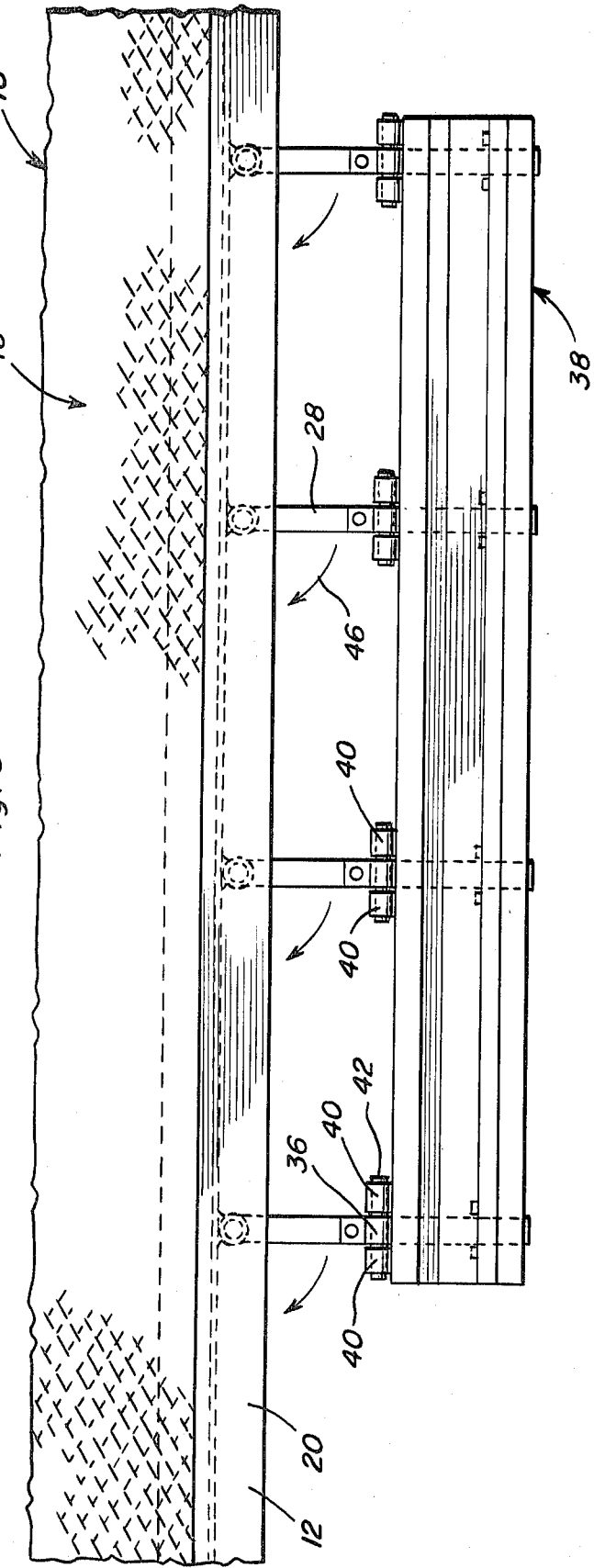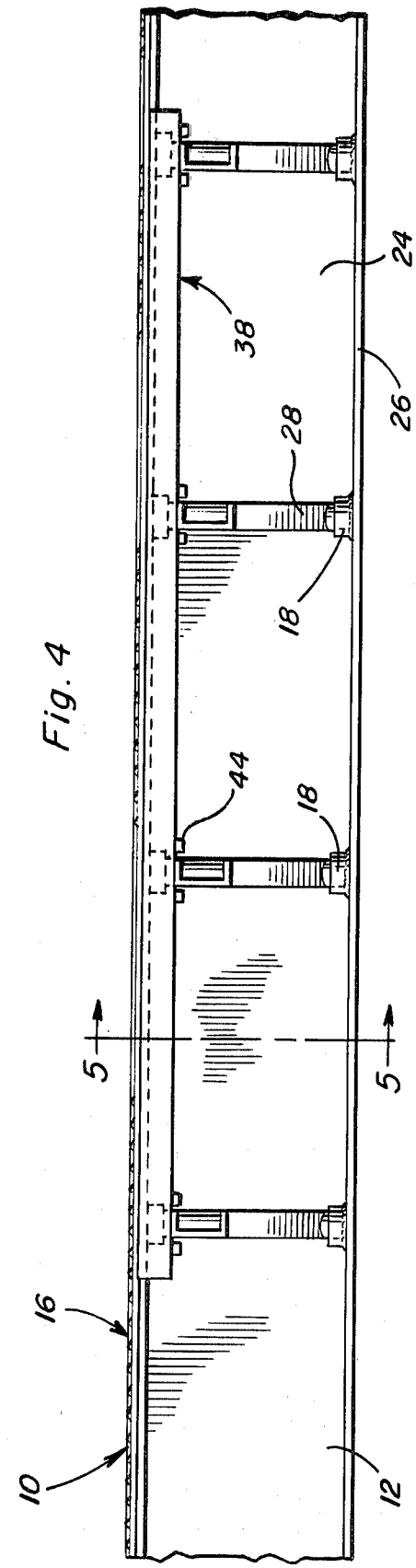

COLLAPSIBLE OUTRIGGER SIDE EXTENSION FOR LOAD BED

BACKGROUND OF THE INVENTION

Various forms of mobile vehicle load beds are sometimes required to support loads wider than the load beds. While load beds may be temporarily widened to support an extra wide load and some load beds are constructed to include laterally extendible load bed width increasing sections, the expenses involved in temporarily widening a load bed and purchasing and maintaining a load bed including conventional extendible sections are great and usually cannot be justified if a widened load bed is only infrequently required.

Accordingly, a need exists for a vehicle load bed which may be quickly increased in width and subsequently decreased in width by the inclusion of relatively inexpensive load bed side extension structure.

Examples of previously known forms of extendible load beds including some of the general structural and operational features of the instant invention are disclosed in U.S. Pat. Nos. 1,332,843, 2,717,802, 2,743,936 and 4,015,858.

BRIEF DESCRIPTION OF THE INVENTION

The load bed of the instant invention includes structure whereby the effective outside marginal edges thereof may be readily extended and retracted through the utilization of relatively inexpensive load bed side extension structure.

The load bed is further constructed in a manner whereby the extension sections thereof are automatically locked in the extended positions as a result of movement of the extension sections to the extended positions thereof.

The main object of this invention is to provide a vehicle load bed which may be readily extended and subsequently reduced in width.

Still another object of this invention is to provide a load bed including extendible side sections which do not increase the over-all width of the associated load bed when the extension sections are in their collapsed positions.

A further object of this invention is to provide a load bed including side extension sections which may be readily shifted between the extended and retracted positions thereof by a single workman.

Yet another object of this invention is to provide a load bed side extension section including but a few duplicated components in addition to a single extension section.

A final object of this invention to be specifically enumerated herein is to provide a load bed side extension in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a load bed constructed in accordance with the present invention and with the extensible side section thereof in a fully collapsed position;

FIG. 2 is a top plan view of the assemblage illustrated in FIG. 1 with a portion of the load bed being broken away and illustrated in horizontal section, an extended position of the extendible side section being illustrated in phantom lines;

FIG. 3 is an enlarged fragmentary top plan view of the portion of the load bed illustrated in FIG. 2 and illustrating the extendible side section in a fully extended position;

FIG. 4 is a side elevational view of the assemblage illustrated in FIG. 3;

FIG. 5 is an enlarged fragmentary transverse vertical sectional view taken substantially upon the plane indicated by the section line 5—5 of FIG. 4; and FIG. 6 is an enlarged fragmentary transverse vertical sectional view taken substantially upon the plane indicated by the section line 6—6 of FIG. 2.

DETAILED DESCRIPTION OF THE INVENTION

Referring now more specifically to the drawings, the numeral 10 generally designates a load bed including a pair of opposite side longitudinal I-beams 12 interconnected by a plurality of longitudinally spaced and transversely extending transverse beams 14 extending and secured to the I-beams 12. A deck assembly referred to in general by the reference numeral 16 is secured over the transverse beams 14 and extends between the I-beams 12.

Spaced along each longitudinal I-beam 12 are pairs of vertically spaced and aligned bearing sleeves 18. Each pair of sleeves 18 includes an upper sleeve and a lower sleeve and the upper sleeves 18 are secured to the underside of the upper flange 20 of the corresponding I-beam 12 and to the outer side 22 of the web 24 of the corresponding beam 12. The lower sleeves 18 are secured to the upper surfaces of the lower flange 26 of the corresponding I-beam 12 and to the outer surface 22 of the web 24 thereof.

A plurality of lengthwise tapering support arms 28 are provided and the major dimension ends of the support arms 28 include vertical pivot shafts 30 secured thereto. The upper and lower ends of each pivot shaft 30 are rotatably journaled in a corresponding pair of upper and lower sleeves 18 and it may be seen from FIGS. 1, 4 and 6 of the drawings that each of the support arms 28 is channel-shaped in cross section.

The support arms 28 may be pivoted between the extended positions thereof illustrated in FIGS. 3 and 4 of the drawings and the collapsed positions thereof illustrated in FIGS. 1 and 2 of the drawings. Further, each of the support arms 28 includes a sleeve mount 32 pivotally supported therefrom by a pivot fastener 34 at a location spaced approximately 30% of the distance from the major transverse dimension end of the arm 28 to the minor transverse dimension end of the arm 28 and each sleeve mount 32 includes a bearing sleeve 36 and is oscillatable relative to the corresponding support arm 28 between a first position with the bearing sleeve 36 disposed transverse to the support arm 28 and a second position with the bearing sleeve 36 generally paralleling the support arm 28.

An elongated extension panel referred to in general by the reference numeral 38 is provided and one longitudinal edge of the extension panel assembly 38 includes longitudinally spaced pairs of axially spaced and aligned sleeves 40 supported therefrom. The extension panel assembly 38 is positioned with each pair of sleeves 40 receiving a bearing sleeve 36 therebetween and each set of sleeves 36 and 40 is pivotally joined together by a pivot pin 42. In addition, the longitudinal marginal edge of the extension panel assembly 38 remote from the longitudinal edge thereof supporting the sleeve 40 includes longitudinally spaced pairs of depending ears 44 for a purpose to be hereinafter more fully set forth.

The support arms 28 and the extension panel assembly 38 together form a parallel linkage structure whereby the extension panel assembly 38 may be horizontally shifted between the retracted and extended positions thereof illustrated in FIGS. 1 and 3 of the drawings to simultaneously swing the support arms 28 between the retracted positions and the extended positions thereof. When the support arms 28 are in the retracted positions thereof illustrated in FIGS. 1 and 2, the extension panel assembly 38 may be swung downwardly to the fully collapsed position thereof illustrated in FIG. 6 of the drawings and recessed wholly within the outer side of the corresponding I-beam 12.

When it is desired to swing the extension panel assembly 38 to the fully extended position thereof, the extension panel assembly 38 is initially upwardly swung in a vertical plane to at least a horizontal position while the support arms 28 remain in the fully collapsed positions thereof and the extension panel assembly 38 is then horizontally swung in order to swing the support arms 28 from the collapsed positions thereof of FIGS. 1 and 2 toward the fully extended positions thereof illustrated in FIGS. 3 through 5. As the support arms 28 approach their fully extended positions, the outer marginal portion of the extension panel 38 is slightly upwardly displaced in order to allow the upper marginal edge portions of the support arms 28 to swing beneath the lower ends of the tabs 44. When each support arm 28 is centered between the corresponding pair of tabs 44, the extension panel assembly 38 is slightly downwardly displaced at its free marginal edge in order to engage and be supported from the outer ends of the support arms 28 with each pair of tabs 44 embracing the outer end of the corresponding support arm 28.

Of course, when it is desired to fully retract the extension panel assembly 38, the outer marginal edge of the extension panel assembly is first lifted to swing the tabs 44 upwardly from the outer ends of the support arms 28 and thereafter swung in the direction of the arrows 46 in FIG. 3 of the drawings until the support arms 28 are in the fully collapsed positions thereof illustrated in FIGS. 1, 2 and 6 of the drawings. Thereafter, the free marginal edge of the extension panel assembly 38 is allowed to swing downwardly until the extension panel assembly 38 is in the vertical fully collapsed position thereof illustrated in FIG. 6.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a generally horizontal load bed including a marginal edge, a plurality of parallel cantilever support arms spaced along said marginal edge and pivotally supported at one set of corresponding ends thereof from said marginal edge for angular displacement relative thereto about upstanding axes between extended positions with the other set of corresponding ends of said arms projecting outwardly from said marginal edge and folded positions with said arms generally paralleling said marginal edge, an elongated extension panel paralleling said marginal edge and overlying and supported from the other set of corresponding ends of said arms, and pivot means pivotally supporting one longitudinal side edge of said panel from said arms for swinging between an operative horizontal position overlying said arms when the latter are in said extended positions and an inoperative vertical position disposed immediately outwardly of and paralleling said arms when the latter are in said folded positions.

2. The combination of claim 1 wherein said pivot means includes means interconnecting said arms for simultaneous horizontal swinging of said arms between said extended and folded positions.

3. The combination of claim 1 wherein said pivot means includes first pivot structures mounted on said arms and second pivot structures mounted on and spaced along said one longitudinal side edge, said first pivot structures being pivotally supported from said arms for angular displacement relative thereto about axes generally paralleling said upstanding axes, said second pivot structures being pivotally supported from said first pivot structures for angular displacement relative thereto about aligned axes generally paralleling said one longitudinal side edge.

4. The combination of claim 3 wherein said first pivot structures are supported from said arms in positions thereon spaced along said arms from said one set of corresponding ends thereof toward the other set of corresponding ends of said arms.

5. The combination of claim 3 wherein the other longitudinal side edge portion of said extension panel and the other set of ends of said support arms include coacting means interlockingly engaged with each other when said support arms are in their extended positions and said extension panel is in said operative position preventing swinging movement of said support arms from said extended positions to the folded positions thereof.

6. The combination of claim 5 wherein said first pivot structures are supported from said arms in positions thereon spaced along said arms from said one set of corresponding ends thereof toward the other set of corresponding ends of said arms.

7. The combination of claim 1 wherein said support arms are generally channel-shaped in cross section and open horizontally longitudinally of said marginal edge of said load bed when said support arms are in the extended positions.

8. The combination of claim 1 wherein said horizontal loan bed includes a pair of opposite side longitudinal marginal edge portions, said marginal edge comprising one of said marginal edge portions, the other of said marginal edge portions also including a plurality of parallel cantilever support arms pivotally supported therefrom for swinging about upstanding axes, and a second extension panel as well as additional pivot means pivotally supporting one longitudinal side edge of the last mentioned panel from the last mentioned support arms for swinging between an operative horizontal position and an inoperative vertical position.

* * * * *